Dec. 27, 1938.  G. DUNCAN  2,141,686

VACUUM PAN

Filed March 8, 1938  2 Sheets-Sheet 1

Inventor
George Duncan
Ritter, Mechlin
& Muir
His Attorneys

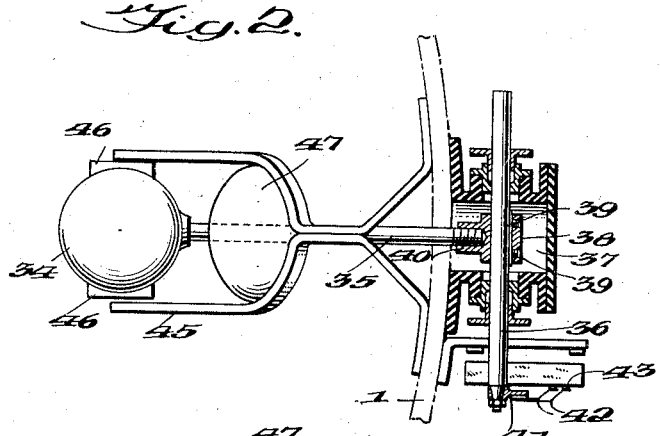
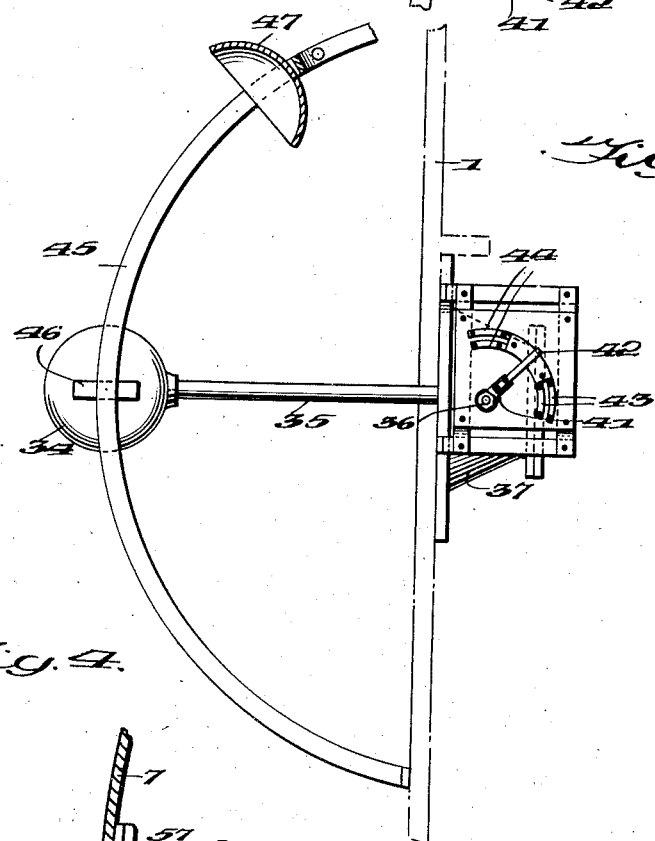
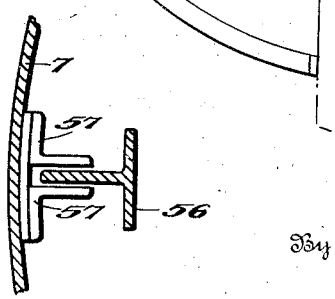

UNITED STATES PATENT OFFICE 2,141,686

VACUUM PAN

George Duncan, Olaa, Territory of Hawaii

Application March 8, 1938, Serial No. 194,711

3 Claims. (Cl. 159—28)

My invention relates to vacuum pans of the calandria type and its principal object is to vary or adjust the effective height of the centerwell of the calandria in accordance with changes in the level of a liquid, such as massecuite, in the vacuum pan.

A primary feature of the invention consists in providing a vacuum pan with vertically movable means which is adapted to increase the effective height of the centerwell of a calandria when the liquid within the pan rises above a predetermined level, means being provided which is responsive to changes in the level of the liquid for actuating the tubular means.

Another feature of the invention consists in providing a vacuum pan with tubular means normally spaced above the centerwell of the calandria, means being provided for moving the tubular means downwardly into association with the centerwell for increasing the effective height thereof.

A further feature of the invention consists in providing a vacuum pan with means responsive to changes in the level of the liquid within the pan for moving the tubular means downwardly into operative association with the centerwell of the calandria when the liquid rises above a predetermined level and for moving the tubular means upwardly into spaced relation with the centerwell when the liquid falls below a predetermined level.

Other features of the invention residing in advantageous forms, combinations and relations of parts will hereinafter appear and be pointed out in the claims.

In the drawings:

Figure 2 is a view, partly in horizontal section, of the means which is responsive to changes in the level of the liquid within the vacuum pan for controlling the movement of the tubular means which is capable of varying the effective height of the centerwell.

Figure 3 is a side elevational view of the means illustrated in Figure 2.

Figure 4 is a detail sectional view taken on line 4—4 of Figure 1.

Figure 1:
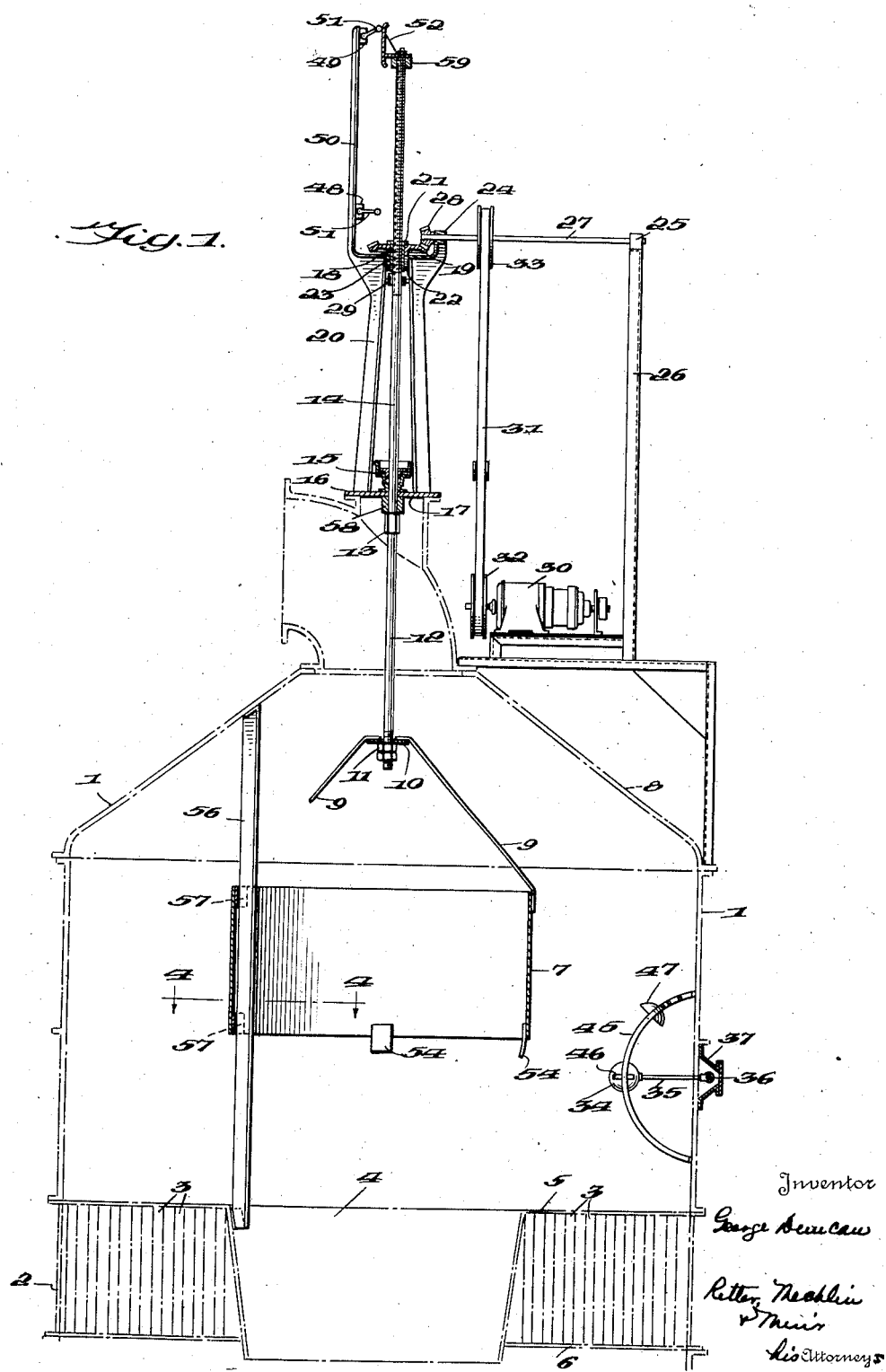
Figure 1 is a view, partly in elevation and partly in vertical section, showing the invention applied to a vacuum pan of the calandria type, the pan being illustrated in dot and dash lines.

Referring more particularly to the drawings, 1 indicates a vacuum pan of conventional construction having a calandria 2 in its lower end which is provided with a plurality of vertical tubes 3 and a centerwell 4, the tubes being supported in upper and lower sheets 5 and 6, respectively.

As is known by those skilled in the art, steam is admitted into one side of the calandria and passes out the other side thereof while the liquid being evaporated in the pan normally circulates upwardly through the tubes 3 and downwardly through the centerwell 4.

When the level of the liquid within the vacuum pan rises a relatively great distance above the upper tube sheet of the calandria, "dead" areas are formed in which there is no substantial circulation of the liquid. These so-called "dead" areas are located in the upper portion of the liquid adjacent the outer wall of the pan and, when the liquid under treatment is massecuite, they cause the formation of false grain which is highly undesirable.

To eliminate these "dead" areas, I provide the vacuum pan with means which is automatically operable when the level of the liquid in the pan rises above a predetermined level to increase the effective height of the centerwell. This means consists of a preferably tubular member 7 which is of substantially the same internal diameter as the upper end of the centerwell 4. It is spaced above the upper tube sheet of the calandria in an amount such that, when the quantity of liquid within the pan is insufficient to cause "dead" areas, it will not project into the liquid and thus interfere with the circulation thereof. In vacuum pans of average size used in crystallizing sugar, it has been found that "dead" areas do not occur in the massecuite until the level of the massecuite rises above the middle of the pan belt, that is substantially midway between the top of the tube sheet and the lower end of the inclined top section 8 of the pan. In such pans, therefore, the tubular member 7 is disposed so that its lower edge will be located substantially at the middle of the pan belt.

Rigidly connected to the upper portion of the tubular member 7 are a plurality of straps 9 which converge upwardly and are rigidly secured to a ring member or the like 10 which is supported on nuts 11 screw threaded on the lower end of a spindle 12. Rigidly connected to the upper end of spindle 12, as by nut 13, is another spindle 14 which extends upwardly through a stuffing box 15 mounted on a plate 16 closing an opening 17 in the upper end of the vacuum pan. The upper portion of the spindle 14 is screw threaded and revolubly mounted thereon is a nut 18 for raising and lowering the spindle and consequently the tubular member 7.

Encircling the nut 18 and keyed thereto is a bevel gear 19 which is mounted upon the upper portion of a suitable support 20. The upper end of the nut 18 is integrally formed with an annular flange 21 which overlappingly engages the upper face of the gear 19, while screw threaded on the lower end of the nut is a collar 22 which is adapted to abut against the lower end of a flange 23 which encircles the nut and is preferably formed integral with the upper portion of the support 20. By this arrangement, it will be perceived that axial movement of the nut 18 and the bevel gear 19 with respect to the support 20 is prevented.

Suitably journaled adjacent one end in a bracket 24 rigid with the support 20 and at its other end in a bearing 25 carried by any convenient support, such as indicated at 26, is a shaft 27 having at its inner end a bevel gear 28 in mesh with bevel gear 19. Rotation of shaft 27 will, therefore, through the intermediacy of gears 19 and 28 impart rotation to nut 18 and thus induce longitudinal movement of spindles 12 and 14 to cause vertical movement of tubular member 7. Rotation of spindle 12, and therefore spindle 14, may be effectively prevented by a collar 29 which is keyed to spindle 12 and is connected, in any suitable manner, to the support 20.

Rotation is preferably imparted to shaft 27 by an electric motor 30 which may be mounted in any suitable manner and in any convenient location on the upper portion of the vacuum pan. While the motor may be directly geared to the shaft 27, the latter may be conveniently driven by the motor by means of a belt 31 which passes around pulleys 32 and 33 respectively mounted on the motor shaft and shaft 27.

To cause the tubular member 7 to move downwardly when the liquid within the pan rises above the level at which "dead" areas will be formed, means is provided which is responsive to changes in the level of the liquid for causing the electric motor 30 to operate. This means includes a float 34 mounted upon an arm 35 which is rigid with a shaft 36 suitably journaled in the side walls of a chamber 37 mounted on the pan. The arm 35 may be conveniently made rigid with the shaft 36 by a collar 38 which encircles the shaft and is secured thereto by set screws 39 and is provided with an internal screw threaded projection 40 for receiving the threaded inner end of arm 35.

Rigidly mounted on one end of the shaft 36 is a switch arm 41 having a pair of spring fingers 42 adapted to bridge either of two sets of contact points 43 and 44 respectively. When the spring fingers 42 bridge the contact points 43 the electric motor 30 is caused to rotate in such direction as to move the tubular member 7 downwardly into engagement with the upper end of the centerwell 4, and when the spring fingers bridge the contact points 44 the electrical motor is caused to operate in the reverse direction to raise the tubular member 7.

To guide the float 34 as it moves in accordance with variations in the level of the liquid within the pan, guide bars 45 may be conveniently employed. The guide bars which are arranged concentric with respect to the axis of rotation of shaft 36 may be disposed within the pan. If desired, the float may be provided at points where it is likely to contact the guide bars with wear plates or straps 46 and secured to the bars adjacent their upper ends is a stop 47 in the form of a spherical segment for limiting upward movement of the float.

To stop the motor 30 from operating after the tubular member has been moved into either its uppermost or lowermost positions, limit switches 48 and 49 are mounted upon an upstanding bracket 50 of the support 20. Each of these switches has a circuit making and breaking arm 51 normaly disposed in the path of movement of a member 52 rigidly mounted on the upper end of the spindle 14.

In the operation of the device, the tubular member 7 will remain in the elevated position shown in Figure 1 of the drawings until the level of the liquid has raised sufficiently to cause, by upward movement of the float, the spring fingers of the switch arm to bridge the contacts 43. The motor is thereupon caused to operate in a direction to cause the tubular member 7 to move downwardly. The motor will continue to operate until the motor circuit is broken by the bracket 52 engaging the arm 51 of the limit switch 48, at which time the tubular member 7 will have moved down into abutting relation with the centerwell 4. To center the tubular member 7 with respect to the centerwell and thus assure its axial alignment therewith, a plurality of fingers or the like 54 extend downwardly below the lower end of the member 7 so as to project into the centerwell. To guide the member 7 while it is being moved vertically and thus prevent it from moving out of axial alignment with the centerwell, two or more T-irons 56 (only one of which is shown in the drawings) may be employed and a plurality of sets of brackets 57 may be secured to member 7 for cooperating with the T-irons.

When the tubular member 7 is in its lowermost position and thus constitutes a continuation of the centerwell 4, the liquid which is moving upwardly through the tubes 3 in the vacuum pan must rise sufficiently to pass down through the tubular member 7 before circulating through the centerwell. It will thus be perceived that circulation of the fluid in the upper part of the pan is assured and the formation of "dead" areas thus eliminated.

When the level of the liquid within the pan drops sufficiently to enable the float to assume a position permitting the spring fingers 42 of the switch arm to bridge the contacts 44, motor 30 is operated in the reverse direction to move the tubular member 7 upwardly, the motor continuing to operate in this direction until the bracket 50 trips the limit switch 49 and thus breaks the motor circuit. Should the limit switch 49 fail to operate, a collar 58 mounted on spindle 14 above the nut 13 will abut against the plate 16 and thus stop upward movement of the spindle, thereby causing the belt 31 to slip. Likewise, should the lower limit switch 48 fail to operate, downward movement of the spindle will be arrested by a nut 59 mounted on the upper end of spindle 14 coming in contact with the nut 18.

From the foregoing, it will be perceived that simple and efficient means have been provided for automatically varying the effective height of the centerwell in accordance with changes in the level of the liquid in the vacuum pan so as to insure complete circulation of all of the liquid and the elimination of all "dead" areas. It is to be understood that the invention is not limited to the precise details which have been illustrated and described and that it is susceptible of modification and embodiment in various forms without departing from the scope of the invention as defined in the appended claims.

What I claim is:

1. In combination with a vacuum pan of the calandria type having a plurality of vertical tubes and a centerwell, tubular means within the vacuum pan normally spaced above the centerwell, said means being movable downwardly into association with the centerwell for increasing the effective height thereof, and means for actuating the tubular means.

2. In combination with a vacuum pan of the calandria type having a plurality of vertical tubes and a centerwell, tubular means disposed within the vacuum pan normally spaced above the centerwell, said tubular means being movable downwardly into association with the centerwell for increasing the effective height thereof, and means responsive to changes in the level of the liquid in the vacuum pan for moving said tubular means downwardly.

3. In combination with a vacuum pan of the calandria type having a plurality of vertical tubes and a centerwell, tubular means disposed within the vacuum pan normally spaced above the centerwell, and means responsive to changes in the level of the liquid within the vacuum pan for moving the tubular means downwardly to increase the effective height of the centerwell when the liquid rises above a predetermined level and for moving the tubular means upwardly into spaced relation with the centerwell when the liquid falls below a predetermined level.

GEORGE DUNCAN.